(12) United States Patent
Durand et al.

(10) Patent No.: US 9,434,478 B2
(45) Date of Patent: Sep. 6, 2016

(54) AIRCRAFT COCKPIT WITH EMERGENCY EXIT VIA A CENTRAL PANE

(71) Applicant: Airbus Operations (SAS), Toulouse (FR)

(72) Inventors: Yves Durand, Aussonne (FR); Bernard Guering, Montrabe (FR)

(73) Assignee: Airbus Operations (S.A.S.), Paris (FR)

(*) Notice: Subject to any disclaimer, the term of this patent is extended or adjusted under 35 U.S.C. 154(b) by 55 days.

(21) Appl. No.: 14/106,113

(22) Filed: Dec. 13, 2013

(65) Prior Publication Data
US 2014/0175220 A1    Jun. 26, 2014

(30) Foreign Application Priority Data
Dec. 13, 2012  (FR) ...................... 12 62000

(51) Int. Cl.
*B64C 1/32* (2006.01)
*B64D 43/00* (2006.01)
*B64C 1/14* (2006.01)

(52) U.S. Cl.
CPC ............. *B64D 43/00* (2013.01); *B64C 1/1476* (2013.01); *B64C 1/32* (2013.01)

(58) Field of Classification Search
CPC ..... B64C 1/1492; B64C 1/1484; B64C 1/14; B64C 1/1476
USPC ......................... 244/129.3, 129.5, 129.4, 121
See application file for complete search history.

(56) References Cited

U.S. PATENT DOCUMENTS

| | | | | |
|---|---|---|---|---|
| 3,050,790 | A * | 8/1962 | Wakefield | 49/215 |
| 3,690,600 | A * | 9/1972 | Cooper | 244/120 |
| 4,220,298 | A * | 9/1980 | Willis | 244/129.5 |
| 5,769,361 | A * | 6/1998 | Charieras et al. | 244/129.4 |
| 5,826,824 | A * | 10/1998 | Martin et al. | 244/129.3 |
| 6,027,073 | A * | 2/2000 | Gratien Ferrier | 244/129.3 |
| 6,883,755 | B2 * | 4/2005 | Pautis et al. | 244/129.3 |
| 8,662,450 | B2 * | 3/2014 | Lamat et al. | 244/129.3 |
| 2002/0017414 | A1 * | 2/2002 | Collinucci | 180/271 |
| 2004/0104306 | A1 * | 6/2004 | Pautis et al. | 244/129.3 |
| 2007/0186838 | A1 * | 8/2007 | Mercier et al. | 114/361 |
| 2007/0186839 | A1 * | 8/2007 | Mercier et al. | 114/361 |
| 2008/0196653 | A1 * | 8/2008 | Erskine | 114/361 |
| 2009/0217860 | A1 * | 9/2009 | Tomatsu | 114/361 |

(Continued)

FOREIGN PATENT DOCUMENTS

| | | | | |
|---|---|---|---|---|
| DE | 3741859 A1 * | 6/1989 | | B64C 1/14 |
| EP | 2394910 A1 | 12/2011 | | |

(Continued)

OTHER PUBLICATIONS

French Search Report for Application No. 1262000 dated Aug. 8, 2013.

*Primary Examiner* — Benjamin P Lee
(74) *Attorney, Agent, or Firm* — Jenkins, Wilson, Taylor & Hunt, P.A.

(57) ABSTRACT

The present invention relates to an aircraft cockpit with a double flight deck in which a central pane of a windscreen can be removed in order to at least partially clear an opening in order to constitute an emergency exit and ensure natural ventilation of the cockpit. Moreover, a central portion of a glare shield and of a flight station instrument panel are optionally moveable in order to facilitate access to the opening in the event of the need for emergency evacuation.

13 Claims, 6 Drawing Sheets

(56) References Cited

U.S. PATENT DOCUMENTS

2012/0017514 A1* 1/2012 Lamat et al. .................. 49/394
2014/0021299 A1* 1/2014 Gorgoglione .............. 244/129.5

FOREIGN PATENT DOCUMENTS

EP 2749492 A1 * 7/2014
WO WO 2013070112 A1 * 5/2013

* cited by examiner

Fig.5b

AIRCRAFT COCKPIT WITH EMERGENCY EXIT VIA A CENTRAL PANE

CROSS-REFERENCE TO RELATED APPLICATION

This application claims priority to and the benefit of French Application Serial No. FR 1262000, filed Dec. 13, 2012, the entire contents of which is incorporated by reference herein.

TECHNICAL FIELD

The present invention relates generally to an emergency exit arrangement in an aircraft cockpit.

Cockpit safety gives rise to problems in modern commercial aircraft because this requirement is becoming more stringent with time and placing increasing restrictions on the layout of the aircraft, including in the case of medium- and long-haul services.

BACKGROUND

In an aircraft, it is necessary to provide for means of evacuation of the occupants of the plane in emergency situations, particularly in the event of a crash in which the urgency of the situation and the deterioration of the aircraft prevent the use of the usual means. Each area must be treated separately. The cabin and the cockpit are two distinct areas.

The cockpit must therefore have its own means of evacuation.

The requirement in this regard as described by the regulations states that:
  a single exit is sufficient if it is located on the centre line of the aircraft,
  two exits are necessary if they are on both sides of the aircraft,
  an emergency exit of the axial ventral type is not acceptable, as a landing with the retracted undercarriage blocking this exit means it is incapable of use.

Today, the solutions currently used in a cockpit are either to use opening panes arranged to the left and right of the pilots or to use an evacuation hatch installed in the upper part of the cockpit, generally rearward of the pilots.

In addition to the safety requirement, there is a need for comfort. Although generally not mandatory, it is desirable when on the ground to offer natural ventilation in the cockpit, regardless of the existence of dedicated air conditioning in the cockpit.

The aforementioned solution consisting of two opening lateral panes generally addresses this problem satisfactorily, to the extent that the opening and closing thereof are carried out simply and reversibly. It is also possible to provide lateral openings of the single-use windscreen pane type for evacuation. Production is simpler in this case, but the comfort function previously described is not available.

Moreover, using opening lateral panes has the drawback in particular that it requires space to be available behind them to allow translational movement in order to clear the opening sufficiently; or else, due to duplication of the requirements for each pilot—the fact of having two required openings gives rise to a multiplication of the corresponding opening mechanisms for example—production in this way is more expensive in terms of weight and time, in comparison for example with a single upper opening constituted by a hatch, for example made of metal.

However, although such a hatch provides a single emergency route as prescribed by the regulations, it may be desirable to have a central exit with more convenient access, and in any case such a hatch does not allow the comfort associated with natural ventilation to be provided.

SUMMARY

The purpose of the present invention is to at least partially overcome the above-mentioned drawbacks by proposing a solution, particularly for a medium- or long-haul aircraft, having at least singularity in terms of emergency egress, positioned so as to be opened easily, while restricting the overall volume of the cockpit as little as possible.

To this end, the invention proposes an aircraft cockpit with a double flight deck comprising a windscreen comprising, in a windscreen frame delimiting a central opening, a central pane, having a closed position in which the central pane fills the opening, and from which it can be removed in order to at least partially clear the opening delimited by the windscreen frame, this opening having sufficiently large dimensions to constitute an emergency exit.

Thus, the invention proposes the use of an opening windscreen pane arranged in an axial portion of the cockpit, allowing it to act as an emergency exit for an emergency evacuation.

Counter intuitively, such a use is compatible with the desire not to obstruct the field of view of the pilots, within the constraints of withstanding flight conditions, and bearing in mind the need to find space to release the central pane.

In an embodiment, the central pane can be fully released towards the inside or towards the outside of the cockpit.

By "windscreen frame" is meant here a frame defining a housing of the central pane, which allows it to be held in place when in the closed position.

For example, in terms of dimensions, an opening 550 mm (millimeters) wide and 600 mm high is a priori an order of magnitude meeting the need for easy evacuation.

For convenience, the central pane of the windscreen is retractable downwards between the closed position and an open position in which the central pane is in a storage location. In this way, the central pane is kept in a known position, in case of need or emergency.

By retractable is meant here that the central pane of the windscreen is at least partially obscured by elements present in the cockpit, such as for example a glare shield or an instrument panel.

Retracting the central pane to the inside of the cockpit moreover allows the movement to be reversible. Thus, in the open position the central pane is allowed not only to act as an emergency exit, but also to provide ventilation to the cockpit before closing the central pane.

Such a downward, i.e. vertical, movement is particularly practical for a central windscreen pane due to the fact that the central portion of a windscreen generally has a significant horizontal curvature.

Further, the size of different elements present in a cockpit will from now on become more and more reduced, for example due to the use of flat screens, optionally touch screens, or more compact avionics bays, making it possible to clear some space in the cockpit, particularly towards the front of the cockpit, making it possible to envisage such displacement of a central windscreen pane with a minimum of alteration to the arrangement of the cockpit.

According to a particularly advantageous aspect, the present invention moreover provides comfort in terms of natural ventilation associated with the ability to open this exit reversibly. To this end, the central pane has moreover at least one intermediate position, between the closed position and the open position, in which it allows ventilation of the cockpit.

Thus, the opening central windscreen pane arranged in an axial portion of the cockpit allows both use as an emergency exit for an emergency evacuation and the provision of the comfort of natural ventilation to the cockpit. The central pane has for example one or more intermediate positions allowing a level of ventilation to be chosen for the cockpit.

Further, a vertical movement of the central pane, linked to its downward retraction for passing from a closed position to an open position, makes it possible moreover to avoid its intrusion on the field of view of one of the pilots and does not obstruct him when the central pane is in an intermediate or open position, which would have been the case with a lateral, i.e. horizontal, movement according to which the central pane in an open or intermediate position would be likely to be in front of a pilot.

According to a useful embodiment, the central pane is mounted capable of sliding on at least one guide track the geometry of which makes it possible to extract the central pane from its windscreen frame and to guide it to its storage location, the central pane being guided and displaced in at least this track by means of rollers.

According to certain particular arrangements, the cockpit comprises moreover a flexible element designed to increase a force that is needed for moving the central pane as and when it is displaced.

For convenience, the cockpit comprises, for example, a dynamic braking device of the central pane, such as for example dynamic braking hydraulic cylinders.

It may be thought that a difficulty resides in the fact that a flight station instrument panel and a glare shield of the central portion of the cockpit fill a large part of the passage necessary for the evacuation of the crew members.

In order to facilitate the evacuation of the crew members from the cockpit, for example the pilots, particularly in emergency situations, an aircraft cockpit is proposed, for example such as described previously, comprising a glare shield having a moveable central portion. This central portion of the glare shield is for example capable of tilting so that it forms an access ramp to the central pane of the windscreen, by means of the windscreen frame, when the central pane is in an open position.

According to specific provisions, in order to facilitate even more an access to the emergency exit formed by the central pane of the windscreen, the cockpit comprises a flight station instrument panel having a moveable central portion. The central portion of the flight station instrument panel is for example retractable or can be withdrawn in order to clear the access to the emergency exit to the greatest extent.

According to a particularly useful embodiment, the central portion of the glare shield is linked on the one hand to the central portion of the flight station instrument panel by a first hinged joint, and on the other hand to the windscreen frame by a second hinged joint, and the central portion of the flight station instrument panel is linked on the one hand to the central portion of the glare shield by the first hinged joint, and on the other hand to a pylon via at least one sliding joint, even preferably a slide hinge.

Such an arrangement of the cockpit thus makes it possible to form a direct access route to the emergency exit formed by the central pane of the windscreen, using the central portion of the flight station instrument panel which is capable of being retracted and the central portion of the glare shield which is then capable of acting as an access ramp.

Generally, it is thus possible to provide for the displacement of any other element present on a priority access route to the emergency exit in order to facilitate any evacuation of the crew members present in the cockpit.

According to another aspect, the invention also proposes a method for opening an emergency exit arranged at the centre of a windscreen in a cockpit, comprising at least one step of controlling the opening of a central pane of the windscreen of the cockpit in which the central pane of the windscreen is displaced towards, slides downwards to, an open position at least partially clearing an opening having sufficiently large dimensions to constitute an emergency exit.

According to a particular embodiment of the invention, the method comprises moreover a step of displacing a central portion of a flight station instrument panel.

According to another particular embodiment of the invention, the method comprises moreover a step of displacing a central portion of a glare shield.

Opening the central pane is for example controlled remotely in order to facilitate it regardless of the central pane not being in direct proximity to the pilots. To this end, such a remote control can be mechanical, for example using a cable or handle, or it can be electrical.

By "remote control" or "controlled remotely" is meant here that the control is at a distance, for example using a lever arm assembly or a hydraulic circuit for a mechanical control, or a wired or wireless electrical system, for example via a cable control or an electric strike plate.

Finally, an aircraft is proposed comprising a cockpit such as defined previously.

BRIEF DESCRIPTION OF THE DRAWINGS

The invention will be well understood on the basis of an embodiment and its advantages will become more apparent on reading the following non-limitative detailed description given by way of illustration, with reference to the attached drawings in which:

FIGS. 8a to 8h show sequences of the folding away of the central portion of the flight station instrument panel and of the central portion of the glare shield in order to allow access to the emergency exit, as well as retraction of the central pane; FIGS. 8c and 8d showing the same sequence viewed respectively in profile and in perspective.

DETAILED DESCRIPTION

Identical elements shown in the set of figures are identified by identical reference numbers.

Generally in this document, the terms "high" or "upper", "low" or "ventral" or "lower", "lateral", "front", "rear" are used to denote a relative position of an element or a movement within a frame of reference associated with an aircraft in the conventional direction of travel. Thus, for example, within the cockpit, the windscreen is situated in front of the seats.

A windscreen 10 of an aircraft generally comprises several panes, symmetrically arranged with respect to a central plane of the aircraft.

According to the invention, an aircraft cockpit with a double pilot station comprises a windscreen 10 comprising a central pane 11, in a windscreen frame 12 delimiting a central opening 13.

Figure 1A:
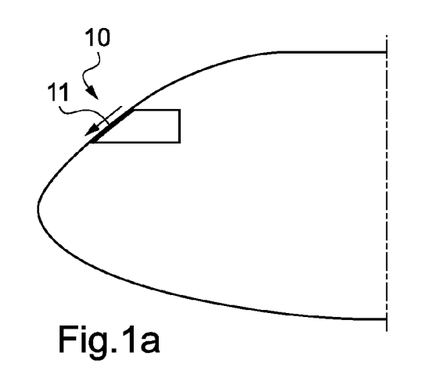
FIGS. 1a and 1b show respectively a profile view and a perspective view of the outside of an aircraft cockpit with a windscreen comprising a central pane in a closed position, according to an embodiment of the invention.
Figure 1B:
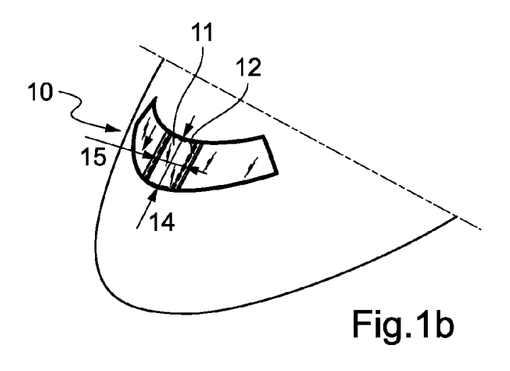

The central pane 11 has a closed position (for example FIGS. 1a and 1b) in which the central pane 11 fills the opening 13 delimited by the windscreen frame 12, and from which it can be moved to clear the opening 13 delimited by the windscreen frame 12, this opening 13 having sufficiently large dimensions to constitute an emergency exit.

In the example shown here, the opening 13 has a height 14 of 600 mm and a width 15 of 550 mm (millimeters), which a priori is an order of magnitude meeting the need for easy evacuation.

Figure 2:
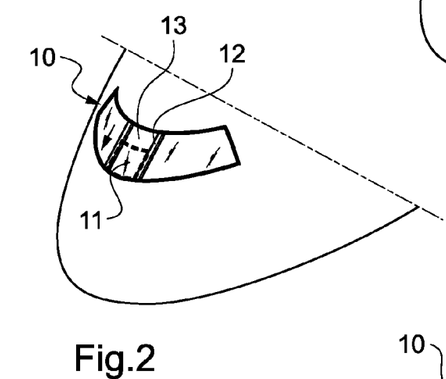
FIG. 2 shows a perspective view of the outside of an aircraft cockpit with the central pane in an intermediate position, according to an embodiment of the invention.
Figure 3:
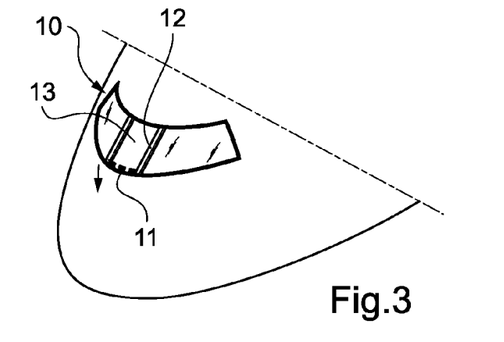
FIG. 3 shows a perspective view of the outside of an aircraft cockpit with the central pane in an open position, according to an embodiment of the invention.

The central pane 11 can be fully released towards the inside or towards the outside of the cockpit. However, in the present embodiment, the central pane 11 of the windscreen 10 is retractable downwards, i.e. in a vertical movement, starting from the closed position, and can adopt an open position, as shown in FIG. 3, in which the central pane is in a storage location, as well as at least one intermediate position, as shown in FIG. 2.

Thus, the central pane 11 of the windscreen 10 allows both use as an emergency exit for an emergency evacuation, and the provision of a comfortable level of natural ventilation to the cockpit. A single intermediate position is shown here but the central pane 11 can of course have several, allowing a level of ventilation to be chosen for the cockpit.

In the open position the central pane 11 then clears the opening 13 at least almost entirely, while in an intermediate position it clears the opening 13 only partially.

As shown in the figures in perspective (for example FIGS. 1b, 2 and 3) the windscreen 10 has a greater horizontal curvature in its central portion. A downward vertical movement allows the opening 13 to be cleared easily, while minimizing any space requirement and without obstructing the field of view of the pilots.

Figure 4A:
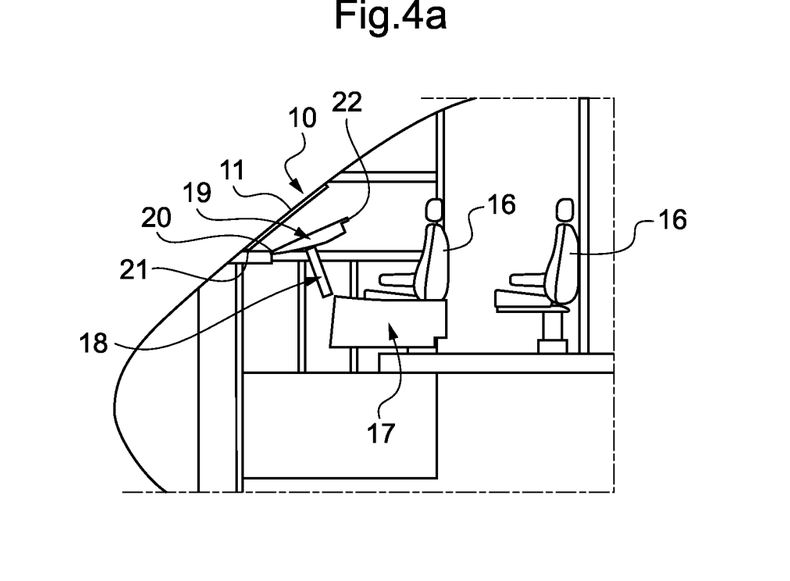
FIGS. 4a and 4b show respectively a cross section profile view and a perspective view of a cockpit according to an embodiment in which the central pane is in a closed position.
Figure 4B:
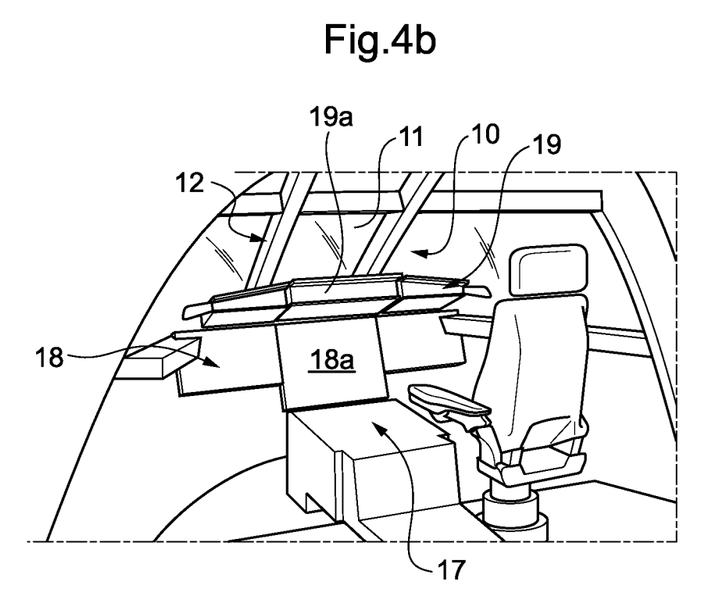

FIGS. 4a and 4b show an embodiment of a cockpit in which the present elements have been optimized to present the smallest possible space requirement.

Conventionally, there are two pilot seats 16 in the cockpit.

The seats 16 are in this case arranged on either side of a central island 17, also known as a pylon. The pylon 17 comprises for example at least part of the avionics bays.

The seats 16 face a flight station instrument panel 18 above which there is a glare shield 19. Each seat 16 accommodates a pilot so that the pilots are seated in the direction of movement of the aircraft. Then the flight station instrument panel 18 faces them, grouping, on the one hand, control means allowing the aircraft to be piloted and, on the other hand, display means allowing the pilots to be informed on the status of the aircraft and on their environment. The control means can be press buttons, thumb wheels, turn buttons or also input means such as tablets or keyboards. For their part, the display means are most often warning lights and screens, and preferably flat screens or even touch screens, in order to reduce the space requirement in the cockpit to the greatest extent.

As shown in FIGS. 4a and 4b, the glare shield 19 is inclined upwards so that a front end 20 of the glare shield 19 is situated at a height less than or equal to a lower edge 21 of the windscreen 10, or preferably in a continuation or an extension of, or at least close proximity to, the lower edge 21 of the windscreen 10. A rear end 22 of the glare shield 19 is higher than its front end 20, allowing effective protection against reflections which would obscure information provided by the flight station instrument panel 18.

Such an arrangement of the cockpit makes it possible to clear some volume in the cockpit, particularly towards the front of the cockpit, allowing displacement of a central pane 11 of windscreen 10 as described previously to be envisaged with a minimum of alteration to this arrangement.

According to another aspect of the present invention, in order to facilitate access to the opening 13, the glare shield 19 has a moveable central portion 19a. By "central" is meant here that the moveable portion 19a of the glare shield 19 is situated preferably in an extension of the opening 13 (whether or not the latter is obscured by the central pane 11). It is moreover preferably situated equidistant from each pilot station in order not to obstruct one pilot more than the other.

Any type of mobility can be conferred on the central portion 19a of the glare shield 19. For example, it could be capable of removal by a pilot.

According to yet another aspect of the invention, this ease of access to the emergency exit is further improved by the fact that the flight station instrument panel 18 also has a moveable central portion 18a. Similarly, by "central" is meant here that the moveable portion 18a of the flight station instrument panel 18 is situated preferably in an extension of the central portion 19a of the glare shield 19 and is moreover preferably situated equidistant from each pilot station in order not to obstruct one pilot more than the other. Similarly, any type of mobility can be conferred on the central portion 18a of the flight station instrument panel 18. For example, it could be capable of removal by a pilot.

Figure 5A:
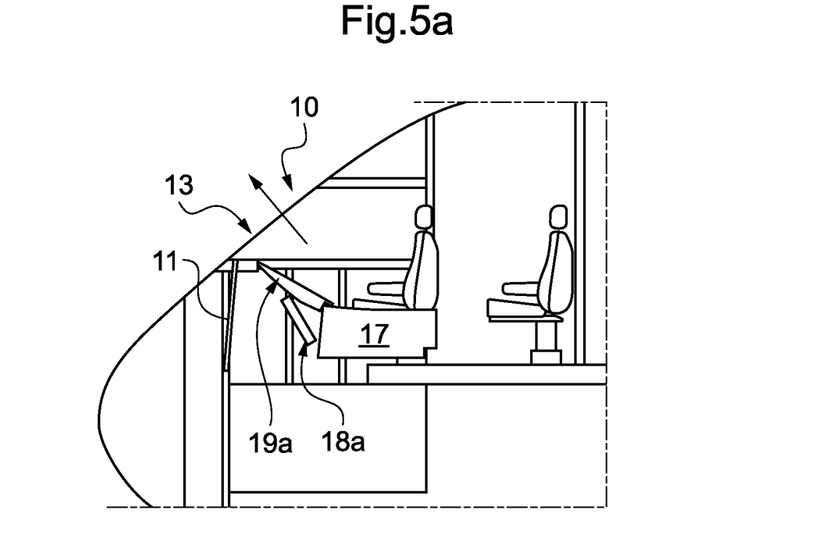
FIGS. 5a and 5b show respectively a cross section profile view and a perspective view of the cockpit according to an embodiment in which the central pane is in an open position with a cleared access route.
Figure 5B:
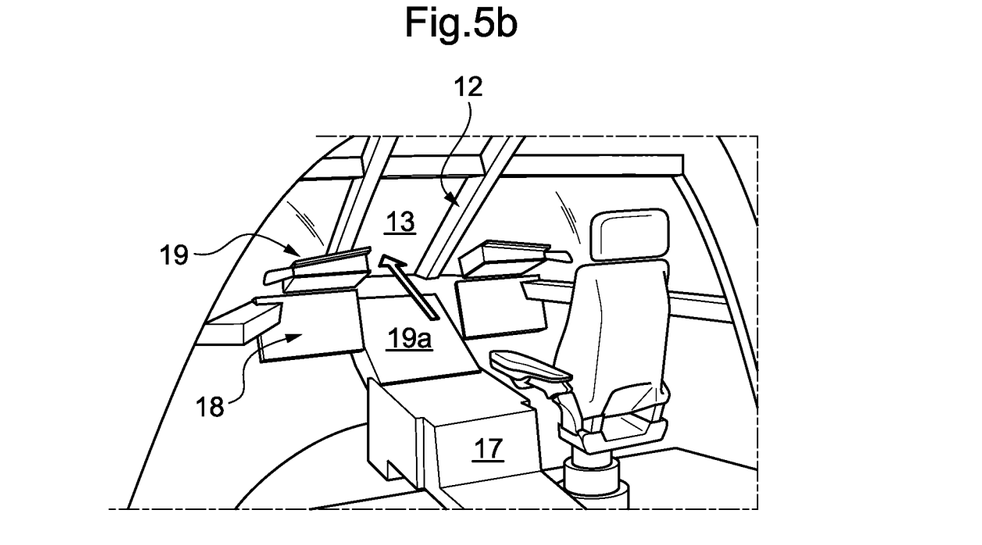

FIGS. 5a and 5b thus show an embodiment of the central pane 11 in the open position, and an access route cleared using the moveable central portions 18a and 19a respectively of the flight station instrument panel 18 and of the glare shield 19. According to an advantageous embodiment, the central pane 11, the central portion 19a of the glare shield 19, the central portion 18a of the flight station instrument panel 18, and the pylon 17 have substantially similar or even identical widths.

Figure 6:
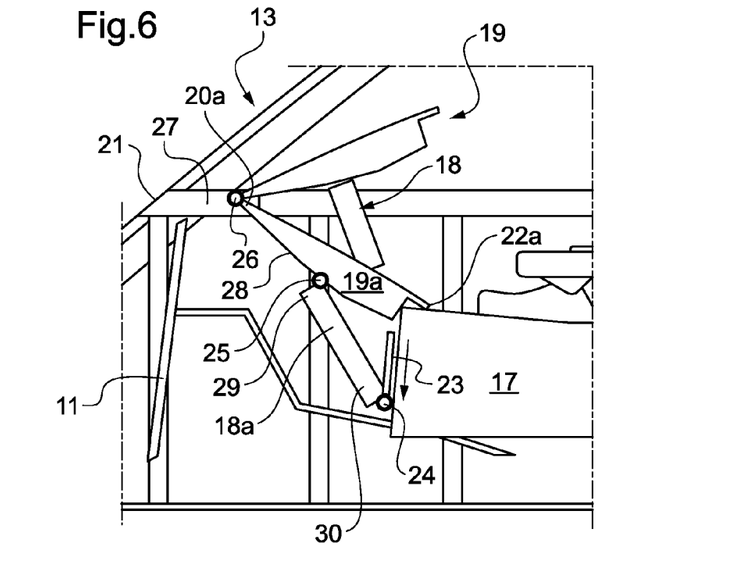
FIG. 6 shows an embodiment according to the present invention of a movement mechanism of a central portion of a glare shield and a central portion of a flight station instrument panel.
Figure 7A:
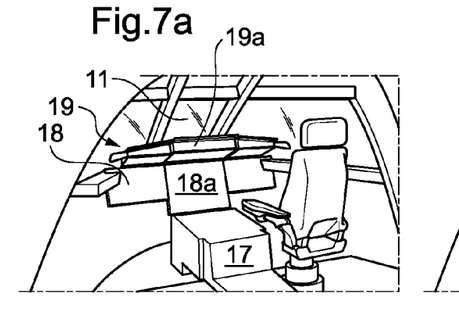
FIGS. 7a to 7d show in perspective sequences of the folding away of the central portion of the flight station instrument panel and of the central portion of the glare shield in order to allow access to the emergency exit.
Figure 7B:
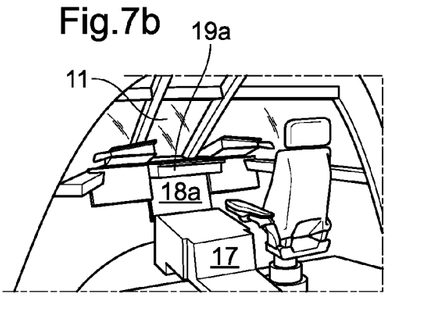
Figure 7C:
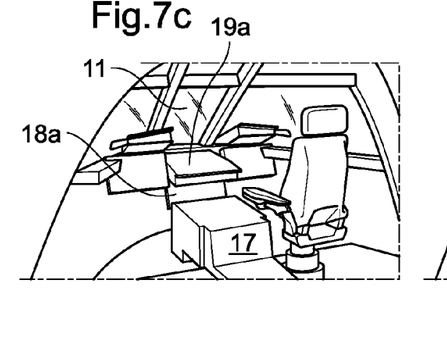
Figure 7D:
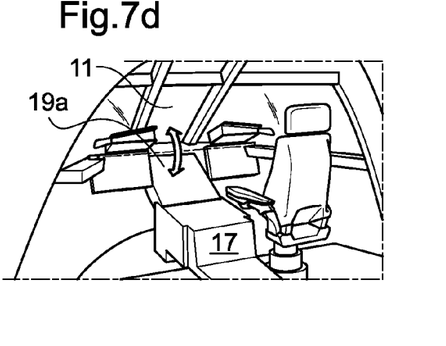

FIG. 6 presents an example of motion giving the central portions 18a and 19a of the flight station instrument panel 18 and of the glare shield 19 a mobility making it possible to further free up an access to the emergency exit formed by the opening 13 when the central pane 11 is in the open position.

Thus, on the one hand, the central pane 11 is moveable. By sliding on tracks it can, according to choice, adopt an open position (as is the case in FIG. 6) or an intermediate position for ventilation of the cockpit. For example, the central pane 11 is mounted capable of sliding on at least one guide track the geometry of which makes it possible to extract the central pane 11 from its windscreen frame 12 and guide it to its storage location, the central pane 11 being guided and displaced in at least this track by means of rollers. The cockpit can moreover comprise a flexible element designed to increase a force that is needed for moving the central pane 11 as and when it is retracted, as well as a dynamic braking device of the central pane 11, such as for example dynamic braking hydraulic cylinders.

On the other hand, and independently of the movement of the central pane 11, the central portions 18a and 19a of the flight station instrument panel 18 and of the glare shield 19 are moveable in order to clear an access route to the emergency exit and to facilitate evacuation.

In the present diagrammatic example in FIG. 6, the central portion 19a of the glare shield 19 is capable of tilting. To this end, it is here linked on one side to the central portion 18a of the flight station instrument panel 18 by a first hinged joint 25 joining a front end 29 of the central portion 18a of the flight station instrument panel 18 to a lower face 28 of the central portion 19a of the glare shield 19. On another side, the central portion 19a of the glare shield 19 is linked to the windscreen frame 12 by means of a structural element 27 by a second hinged joint 26 at the level of its front end 20a, the portion of the front edge 20 of the glare shield 19 corresponding to the central portion 19a. The structural element 27 thus forms a link between the front end 20a of the central portion 19a of the glare shield 19 and the lower edge 21 of the windscreen 10, so that the front end 20a of the central portion 19a of the glare shield 19 is situated in an extension of the lower edge 21, for example in the same horizontal plane, or even in the same horizontal plane as a lower portion of the windscreen frame 12.

Moreover, in this embodiment, the moveable central portion 18a of the flight station instrument panel 18 is linked on one side to the central portion 19a of the glare shield 19 by the first hinged joint 25 situated at the level of its front end 29 and, on another side, the central portion 18a of the flight station instrument panel 18 is linked to the pylon 17 by a slide hinge type joint 23, 24 situated at its rear end 30, i.e. a combination of a sliding joint and a hinged joint. The slide hinge 23, 24 is for example constituted by a track 23 for translational movement, allowing pivoting about an axis orthogonal to the track 23, and a stop 24 at a lower end of the track 23. The slide hinge 23, 24 can for example comprise a single track 23 positioned centrally with respect to the central portion 18a of the flight station instrument panel 18, or two tracks 23 such that each of the tracks 23 is arranged along a lateral end of the central portion 18a of the flight station instrument panel 18.

Thus, the central portion 18a of the flight station instrument panel 18 executes a mainly downward movement in vertical translation while the central portion 19a of the glare shield 19 executes a rotational movement around the second hinged joint 26, driven by the central portion 18a of the flight station instrument panel 18.

Their movement is stopped and their position is stable when the access route to the emergency exit is cleared due to the fact that the central portion 19a of the glare shield 19 comes into abutment with the pylon 17 via its rear end 22a (portion of the rear edge 22 of the glare shield 19 corresponding to the central portion 19a), and that the rear end 30 of the central portion 18a of the flight station instrument panel 18 is stopped by the stop 24 of the slide hinge 23, 24.

Moreover, the end 22a is here formed by a flange allowing any surface discontinuity to be limited when the central portion 19a of the glare shield 19 is in abutment with the pylon 17.

Thus, the central portion 19a of the glare shield 19 in the tilted position forms an access ramp to the opening 13 delimited by the windscreen frame 12 when the central pane 11 is in an open position, and the central portion 18a of the flight station instrument panel 18 is then retracted or withdrawn.

Such an arrangement of the cockpit thus makes it possible to form a direct access route to the emergency exit formed by the central pane 11 of the windscreen 10, using the central portion 18a of the flight station instrument panel 18 which is capable of being retracted and the central portion 19a of the glare shield 19 which is then capable of acting as an access ramp.

The weight of the moveable assembly (the central portions 18a and 19a) can moreover be braked in the same way as for the central pane 11. However, it is not essential to compensate for this weight, to the extent that a change in position of these moveable portions (18a and 19a) is normally only carried out once, in an emergency situation.

In a standard position the front end 20a of the central portion 19a of the glare shield 19 is lower than its rear end 22a, while in the tilted position the front end 20a of the central portion 19a of the glare shield 19 is at least as high as its rear end 22a, and preferably higher.

As regards the central portion 18a of the flight station instrument panel 18, both in standard position and in the retracted (or withdrawn) position, its front end 29 is higher than its rear end 30.

FIGS. 7a to 7d show these movements of central portions 18a and 19a, while the central pane 11 is here immobile in the closed position. Thus, in FIG. 7a, the central portions 18a and 19a are in standard position; in FIGS. 7b and 7c, the central portions 18a and 19a are in two different positions during movement; then in FIG. 7d, the central portion 18a of the flight station instrument panel 18 is completely hidden while the central portion 19a forms an access ramp to the emergency exit.

Generally, it is thus possible to provide for the displacement of any other element present on a priority access route to the emergency exit in order to facilitate any evacuation of the crew members present in the cockpit.

According to the present embodiment, a method for opening an emergency exit arranged in the centre of a windscreen 10 in a cockpit thus comprises for example at least the following steps:

A step of controlling the opening of a central pane 11 of a windscreen 10 of the cockpit, in which the central pane 11 of the windscreen 10 is displaced towards an open position at least partially clearing an opening 13 having sufficiently large dimensions to constitute an emergency exit, which consists here of downward sliding;

A step of displacing a central portion 18a of a flight station instrument panel 18, consisting here of unlocking in a downward translational movement the central portion 18a of the flight station instrument panel 18;

A step of displacing a central portion 19a of a glare shield 19, consisting here of a downward tilting of the central portion 19a of the glare shield 19.

In the case in point, the translational movement of the central portion 18a of the flight station instrument panel 18 and the tilting of the central portion 19a of the glare shield 19 then take place simultaneously since the central portion 19a of the glare shield 19 is linked to, or even driven by, the central portion 18a of the flight station instrument panel 18. However, according to other possible embodiments, their movements can be simultaneous or separate, and the central portions 18a and 19a can be linked or independent.

Optionally, the opening of the central pane 11 is controlled remotely in order to facilitate it regardless of the central pane 11 not being in direct proximity to the pilots. To this end, such a remote control can be mechanical, for example using a cable or handle, or it can be electrical.

By "remote control" or "controlled remotely" is meant here that the control is at a distance, for example using a lever arm assembly or a hydraulic circuit for a mechanical control, or a wired or wireless electrical system, for example via a cable control or an electric strike plate.

FIGS. 8a to 8h show this method according to an example in which firstly the central pane 11 is retracted (FIGS. 8a to 8d), then secondly an access route is cleared (FIGS. 8e to 8h).

Figure 8A:
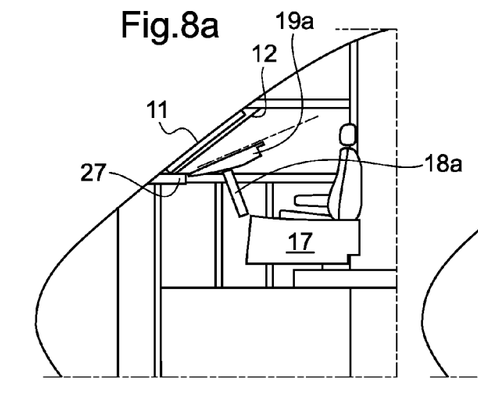
Figure 8B:
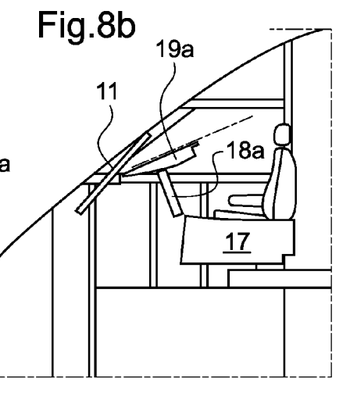
Figure 8C:
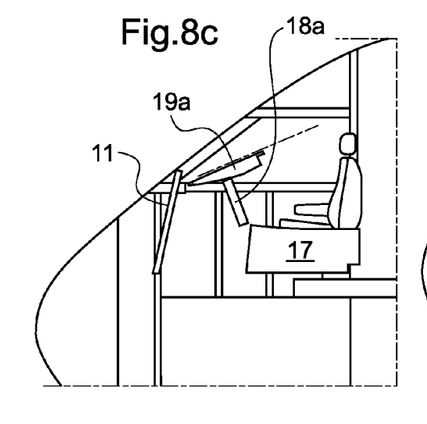
Figure 8D:
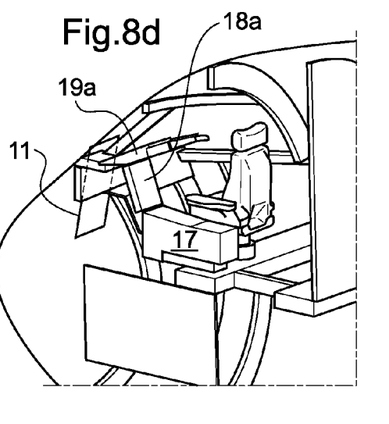
Figure 8E:
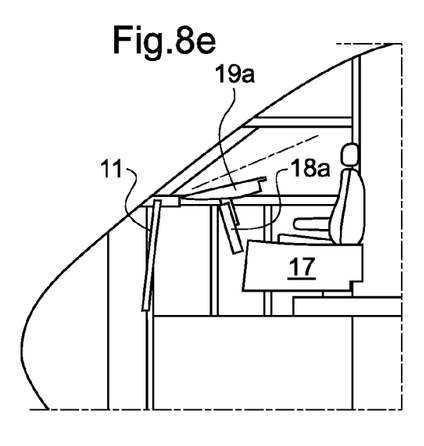
Figure 8F:
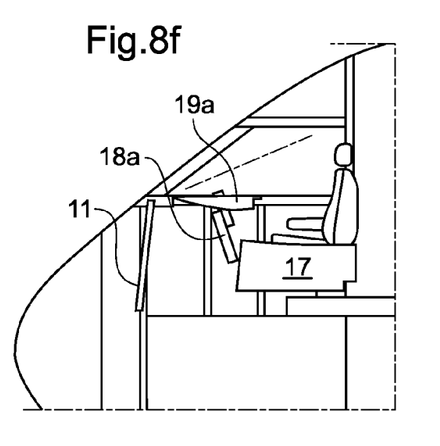
Figure 8G:
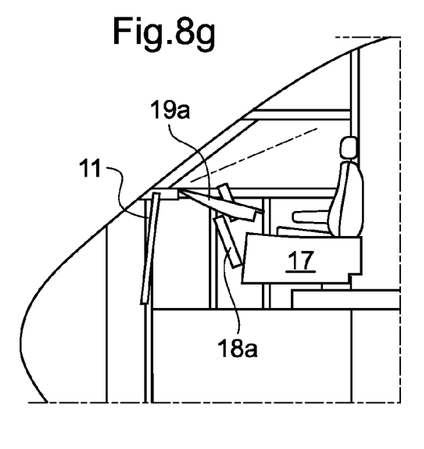
Figure 8H:
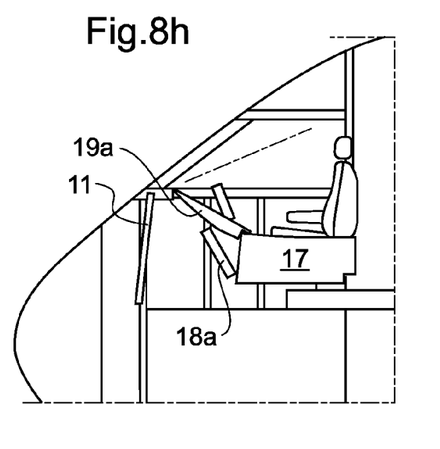

More specifically, in FIG. 8a, the central pane 11 is in the windscreen frame 12 in the closed position. In FIG. 8b, the central pane 11 is in an intermediate position. It is then possible to return it to its closed position (returning to the position in FIG. 8a) or to open it, i.e. to retract it completely. In FIG. 8c, the central pane 11 is in the retracted position; FIG. 8d shows this same configuration but in a perspective view. In this position, the central pane 11 allows significant ventilation of the cockpit and/or can be used as an emergency exit.

If the central pane 11 is to be used as an emergency exit, it is then more convenient for the access to be cleared. To this end, as shown in FIGS. 8e to 8h, the central portion 18a of the flight station instrument panel 18 descends, i.e. moves vertically downwards in translation, while the central portion 19a of the glare shield 19 tilts. Thus, in FIG. 8h, the access ramp is formed by the central portion 19a of the glare shield 19. This configuration then allows easier and more rapid evacuation of the cockpit.

Once the route is cleared, the crew can escape from the cockpit in the conventional manner by using a knotted rope, for example stored in direct proximity to the opening 13, or for example a single-use device with cables, handle and inertia brake.

Of course, the present invention is not limited to the foregoing description, but extends to any variant within the framework of the following claims.

The invention claimed is:

1. An aircraft cockpit with a double flight deck, comprising:
   a windscreen comprising a plurality of panes and a windscreen frame delimiting a central opening, the central opening having sufficiently large dimensions to constitute an emergency exit;
   wherein a central pane of the plurality of panes is movable between a closed position in which the central pane fills the central opening and an open position in which the central pane is removed from the central opening in order to at least partially clear the central opening delimited by the windscreen frame, the central pane of the windscreen being retractable downwards to a storage location when moved between the closed position and the open position.

2. The cockpit according to claim 1, wherein the central pane has moreover at least one intermediate position, between the closed position and the open position, in which it allows ventilation of the cockpit.

3. The cockpit according to claim 1, wherein the central pane is mounted capable of sliding on at least one guide track the geometry of which makes it possible to extract the central pane from its windscreen frame and to guide it to its storage location, the central pane being guided and displaced in at least this track via rollers.

4. The cockpit according to claim 1, comprising a flexible element designed to increase a force that is needed for moving the central pane as and when it is displaced.

5. The cockpit according to claim 3, comprising a dynamic braking device of the central pane.

6. The cockpit according to claim 1, comprising a glare shield having a moveable central portion.

7. The cockpit according to claim 1, comprising a flight station instrument panel having a moveable central portion.

8. The cockpit according to claim 6, comprising a flight station instrument panel having a moveable central portion;
   wherein the central portion of the glare shield is linked to the central portion of the flight station instrument panel by a first hinged joint,
   wherein the central portion of the glare shield is linked to the windscreen frame by a second hinged joint, and
   wherein the central portion of the flight station instrument panel is linked to a pylon by a slide hinge.

9. A method for opening an emergency exit arranged at the centre of a windscreen in a cockpit, the method comprising at least one step of controlling the movement of a central pane among a plurality of panes of the windscreen of the cockpit in which the central pane of the windscreen slides downwards relative to a windscreen frame of the windscreen to an open position, at least partially clearing an opening having sufficiently large dimensions to constitute an emergency exit.

10. The method according to claim 9, comprising a step of displacing a central portion of a flight station instrument panel.

11. The method according to claim 9, comprising a step of displacing a central portion of a glare shield.

12. An aircraft comprising a cockpit according to claim 1.

13. An aircraft cockpit with a double flight deck, comprising:
   a windscreen comprising, in a windscreen frame delimiting a central opening, a central pane, having a closed position in which the central pane fills the central opening and from which the central pane can be removed in order to at least partially clear the central opening delimited by the windscreen frame, the opening having sufficiently large dimensions to constitute an emergency exit, the central pane of the windscreen being retractable downwards between the closed position and an open position in which the central pane is in a storage location,
   a glare shield having a moveable central portion, and
   a flight station instrument panel having a moveable central portion,
   wherein the central portion of the glare shield is linked to the central portion of the flight station instrument panel by a first hinged joint, to the windscreen frame by a second hinged joint, and
   wherein the central portion of the flight station instrument panel is linked to the central portion of the glare shield by the first hinged joint, and to a pylon by a slide hinge.

* * * * *